United States Patent
Kaply et al.

(10) Patent No.: US 6,310,608 B1
(45) Date of Patent: Oct. 30, 2001

(54) SYSTEM AND METHOD OF KEYBOARD CONFIGURATION FOR DISABLED USER ACCESS

(75) Inventors: Michael Aaron Kaply; Herman Rodriguez; Newton James Smith, Jr., all of Austin, TX (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/364,011

(22) Filed: Jul. 29, 1999

(51) Int. Cl.[7] .................................................. G09G 5/00
(52) U.S. Cl. .......................... 345/168; 341/22; 400/485
(58) Field of Search .................................. 345/168, 169, 345/172; 341/22, 23, 28, 26, 21; 400/485, 479, 486, 472, 489

(56) References Cited

U.S. PATENT DOCUMENTS

| | | | |
|---|---|---|---|
| 5,041,819 | * 8/1991 | Takeda | 345/168 |
| 5,181,029 | * 1/1993 | Kim | 341/22 |
| 5,581,243 | * 12/1996 | Ouellette et al. | 345/168 |
| 5,659,373 | * 8/1997 | Hoekstra | 341/22 |

OTHER PUBLICATIONS

Boyd et al., "An Eight–Key Micro–Computer Keyboard Suitable for the Physically Handicapped," International Conference on Man/Machine Systems, Jul. 1982, pp. 178–180.

Johnson et al., "Keyboards for the Handicapped: A New Concept," Proceedings of the 19th Hawaii International Conference on System Sciences, 1986, pp. 95–104.

Levine et al., "Computer Disambiguation of Multi–Character Key Text Entry: An Adaptive Design Approach," Proceedings of the IEEE International Conference on Systems, Man, and Cybernetics, Oct. 1986, pp. 298–301.

Lesher et al., "Optimal Character Arrangement for Ambiguous Keyboards," IEEE Transactions on Rehabilitation Engineering, vol. 6, No. 4, Dec. 1998, pp. 415–423.

Izarek et al., "Access by," Computer Shopper, Aug. 1998, pp. 456–457 and 460–461.

\* cited by examiner

*Primary Examiner*—Regina Liang
(74) *Attorney, Agent, or Firm*—Kevin L. Daffer; Conley, Rose & Tayon P.C.

(57) ABSTRACT

A system and method for grouping together multiple keys on a keyboard to form compound keys is presented. An exemplary configuration of compound keys involves grouping function keys "F1" through "F4" together to form one key, grouping function keys "F5" through "F8" to form a second key, and grouping function keys "F9" through "F12" to form a third key. In such an embodiment, actuating any of the keys "F1" through "F4" results in the same input to the operating system or application program. A compound key may be assigned to a response such as "yes", "enter", or "cancel". In another embodiment, a group of keys could be assigned to a particular alphanumeric character. The alphanumeric keys could in this way be grouped into a reduced number of larger alphanumeric compound keys. A separate group of keys (e.g., the numeric keypad) may be used to toggle between different arrangements of these compound keys, so that all characters may be accessed. A representation of the keyboard illustrating the key groupings active at a particular time and the input corresponding to each grouping may be displayed on the computer's display screen. Alternatively, a template laid over the keyboard may be used to indicate the compound key groupings, particularly for applications in which the grouping does not change during the performance of a task.

30 Claims, 6 Drawing Sheets

SYSTEM AND METHOD OF KEYBOARD CONFIGURATION FOR DISABLED USER ACCESS

BACKGROUND OF THE INVENTION

1. Field of the Invention

This invention relates to computer system design, and more particularly to configuration of a keyboard to make a computer more accessible for disabled users.

2. Description of the Relevant Art

The following descriptions and examples are not admitted to be prior art by virtue of their inclusion within this section.

The personal computer (PC) is becoming increasingly ubiquitous in workplace and home environments. More and more people are therefore becoming PC users. The most common means of user interaction with a PC are the keyboard and the mouse. Such interaction is often mediated by a program interface called a graphical user interface (GUI). A GUI typically includes a representation of computer-based entities including programs, files, and commands in a graphical form on a display screen. In most cases the user interacts with a program or operating system through the GUI by selecting and/or moving objects on the screen using a mouse or other pointing device. Use of a GUI can make interaction with a program or operating system more intuitive than use of a command interface in which specific commands are typed in by the user. This may be true particularly in the case of relatively inexperienced users, because the user is freed from having to learn specific commands.

Although use of a mouse to interact with computer applications is simple and intuitive for many, manipulation of a mouse can be difficult for users having certain disabilities. Various conditions, such as cerebral palsy, Parkinson's disease, or arthritis, can interfere with the manual motor control needed to use a mouse to move a pointer to a specific location on a display screen. Such movement of a pointer is often required, for example, in selecting options such as "yes", "no", "save" or "cancel" in response to queries from an application program or operating system. Use of a GUI can therefore be extremely difficult for users with impaired motor control. A "disabled user" as used herein refers to a keyboard user having such an impairment of manual motor control.

In many operating systems, some alternatives to mouse use are available in the form of particular keys on the keyboard which are assigned to certain answers to queries encountered when using a GUI. For example, the "Enter" key on a keyboard may typically be used to select the "default" response to a query. The default response is often represented on the display screen as a "button" surrounded by a thicker border than the buttons corresponding to other possible responses. In addition, the "escape" key may often be used to select a "cancel" response. Such key mappings are convenient for users who prefer less movement of a hand away from the keyboard, and may be helpful to some disabled users. Unfortunately, many users who lack the motor control needed to use a mouse may also have difficulty in using a finger to select a particular keyboard key.

Some specialized keyboards and other entry devices are available which provide larger keys for disabled users. Such devices can be expensive, however, and inconvenient for use on a computer shared with conventional keyboard users. It would therefore be desirable to develop a system and method to allow more effective use of a computer keyboard by disabled users.

SUMMARY OF THE INVENTION

The problems outlined above are in large part addressed by a system and method for grouping together multiple adjacent keys on a keyboard to form compound keys, each of the compound keys include multiple single keys and a footprint of the totality of multiple single keys are therefore larger than a single key. Each compound key beneficially carries out a single input command, task, function or equivalents thereof. The arrangement of the keyboard into compound keys may take many forms. For example, on keyboards having function keys arranged in groups of four, the function keys "F1" through "F4" may be grouped together as one key, with "F5" through "F8" forming a second key, and "F9" through "F12" forming a third key. In such an embodiment, actuating any of the keys "F1" through "F4" would result in the same input to the operating system or application program. Such a group of keys could be assigned to a response such as "yes", "enter", or "cancel". As another example, the alphabetic keys could be divided into two groups, with one side of the keyboard corresponding to a "yes" response while the other side corresponds to a "no" response. Alternatively, smaller groups of keys could be assigned to particular letters. For example, actuation of the "E" key and/or some of the keys surrounding it could result in an input of the letter "E" to the operating system or application program. The alphabetic keys could in this way be grouped into a reduced number of larger alphabetic keys. A separate group of keys (e.g., the numeric keypad) may be used to toggle between different arrangements of these larger alphabetic keys, so that all letters may be accessed. A representation of the keyboard illustrating the key groupings active at a particular time and the input corresponding to each grouping may be displayed on the computer's display screen. Alternatively, a template laid over the keyboard may be used to indicate the compound key groupings, particularly for applications in which the grouping does not change during the performance of a task.

This grouping of the keyboard keys into compound keys into compound keys is believed to be advantageous to the operation of a keyboard by disabled users. A compound key may be actuated by pressing one or more of the keys within the compound key. The compound keys may be made significantly larger than conventional keyboard keys, so that a user with limited mobility or dexterity may more easily send the appropriate keyboard input or command. In the case of configurations having very large compound keys, for example, simply brushing a hand against the keyboard may be sufficient to produce an appropriate response to a query from a program. Because a conventional computer keyboard may be used, the computer may be shared with conventional keyboard users by reconfiguring the keyboard so that the keys are no longer grouped into compound keys. In this way, disabled users may be accommodated without a requirement for a separate specialized keyboard.

The compound key formation is preferably implemented by assigning a code generated when a particular keyboard key is actuated to a specific command (such as a character or response) to be sent to a program operating on the computer. The assignment of multiple key codes to a single specific command causes the corresponding group of multiple keys to act as a compound key. This assignment may be performed in any of several ways, such as through a keyboard device driver stored in the memory of the computer, through the computer's basic input/output system (BIOS), or within an operating system or application program running on the computer.

A method for using the keyboard configuration system described above is also contemplated. An appropriate input command, such as an answer to a query from a program running on the computer, is identified. The compound key corresponding to this input command is then identified, and one or more of the keyboard keys grouped within this compound key is actuated, such that the appropriate input command is sent to the program. Identification of the compound key corresponding to the desired input command may be accomplished with the help of a keyboard guide, such as a representation of the keyboard on the computer's display screen, or a template overlying the keyboard, as described above. The method may also include actuation of a compound key used to toggle between keyboard configurations. For example, in an embodiment for which the alphabetic keys are "enlarged" by grouping the keys surrounding a particular letter key with that key to form a compound key representing that letter, a reduced number of letter keys are available on the keyboard. Use of multiple keyboard configurations containing compound keys representing different letters may allow all letters to be available for input. One or more different groups of keys, such as those of the numeric keypad, may be grouped together to form one or more compound keys used to switch between these multiple keyboard configurations.

A method for processing input from a keyboard configured for disabled users is further contemplated. A key code generated by actuation of a keyboard key is detected, and the corresponding input command (or compound key command) is identified. The input command is then forwarded to a program running on the computer. Detection of the key code preferably includes ignoring additional key codes detected within a predetermined time interval following an initial key code detection. In this way, multiple keys within a compound key may be actuated in the process of selecting a compound key, without sending multiple input commands. The method may also include forwarding to the computer's display screen a representation of the keyboard illustrating the grouping of the keyboard keys into compound keys.

A computer-usable carrier medium having program instructions executable to implement the above-described method for processing input is also contemplated herein. The carrier medium may be a storage medium, such as a magnetic or optical disk, a magnetic tape, or a memory. In addition, the carrier medium may be a wire, cable, or wireless medium along which the program instructions are transmitted, or a signal carrying the program instructions along such a wire, cable or wireless medium. In an embodiment, the carrier medium may contain program instructions executable to implement detection of a key code generated by actuation of a keyboard key, identification of a compound key command corresponding to the key code, and forwarding of the compound key command to a program running on the computer.

BRIEF DESCRIPTION OF THE DRAWINGS

Other objects and advantages of the invention will become apparent upon reading the following detailed description and upon reference to the accompanying drawings in which:

FIG. 8 is a flow diagram illustrating an embodiment of a method of using a keyboard configured for disabled user access.

Figure 1:
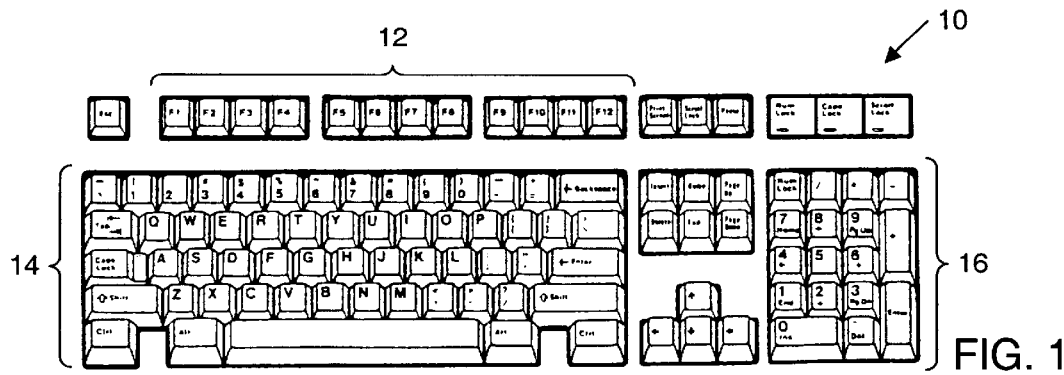
FIG. 1 is a perspective view of the typical computer keyboard.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 is a perspective view of a typical computer keyboard. Keyboard 10 includes a block of alphanumeric keys 14, a group of function keys 12, and a numeric keypad 16. The keyboard of FIG. 1 is often termed an "advanced" or "extended" keyboard, and has a popular layout for use with IBM-compatible PCs. This layout will be used for the embodiments described herein, but the system and method are also applicable to other keyboard layouts.

Figure 2A:
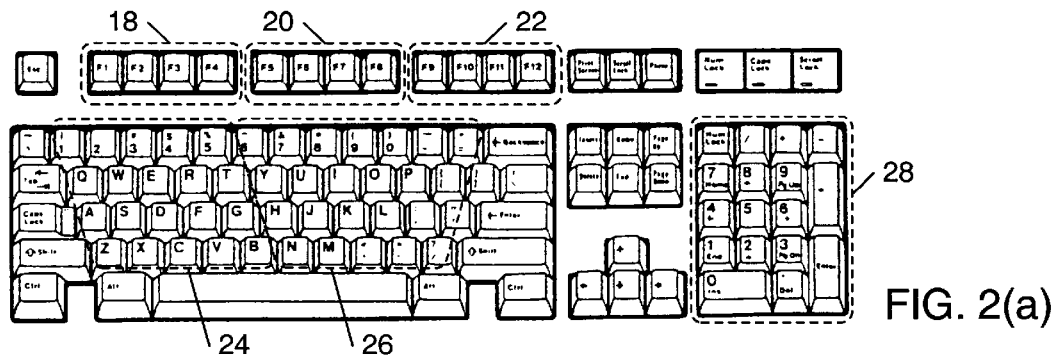
FIGS. 2a, 2b illustrates grouping of keyboard keys into compound keys for sending commands, according to embodiments of the system and method recited herein.
Figure 2B:
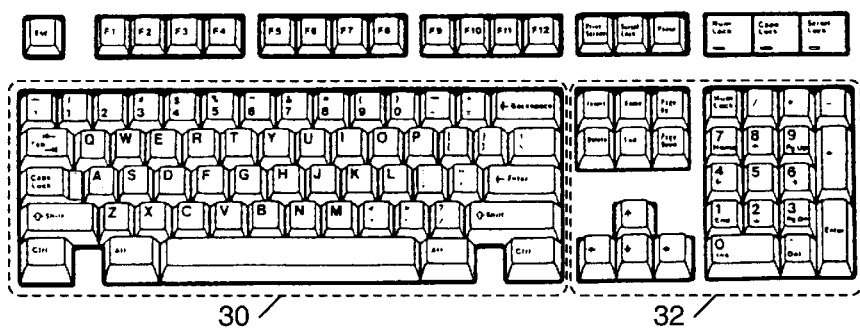

Exemplary groupings of adjacent keys to form compound keys are shown in FIG. 2. In the embodiment of FIG. 2a, function keys F1 through F4 are grouped to form compound key 18, F5 through F8 are grouped to form compound key 20, and F9 through F12 are grouped to form compound key 22. A group of keys on the left side of the block of alphanumeric keys 14 is grouped to form compound key 24, and the group of keys comprising roughly the right half of the alphanumeric key block is grouped to form compound key 26. The numeric keypad keys are further grouped to form compound key 28. These compound keys may be assigned to various commands to be sent to a program running on the computer. For example, the keyboard may be configured such that key 18 sends and "escape" command, key 20 sends a "save" command, and key 22 sends a "cancel" command. Such a configuration could further assign a "yes" response to key 24, a "no" response to key 26, and an "enter" command to key 28. In the alternative embodiment of FIG. 2(b), most of the keyboard keys are grouped into two compound keys. Compound key 30, formed from the alphanumeric block of keys, may be assigned a "yes" response in one embodiment, while compound key 32, formed from grouping the numeric keypad with arrow keys and special function keys, may be assigned a "no" response. The large compound keys provided by the embodiment of FIG. 2(b) may be particularly manageable for disabled users to actuate. The limited variety of possible inputs from the keyboard, however, may make this embodiment useful for interaction with only a limited number of computer programs. In fact, computer programs specifically designed to operate using a very limited range of user inputs (in the embodiment of FIG. 2(b), only "yes" and "no") may be needed.

Figure 3:
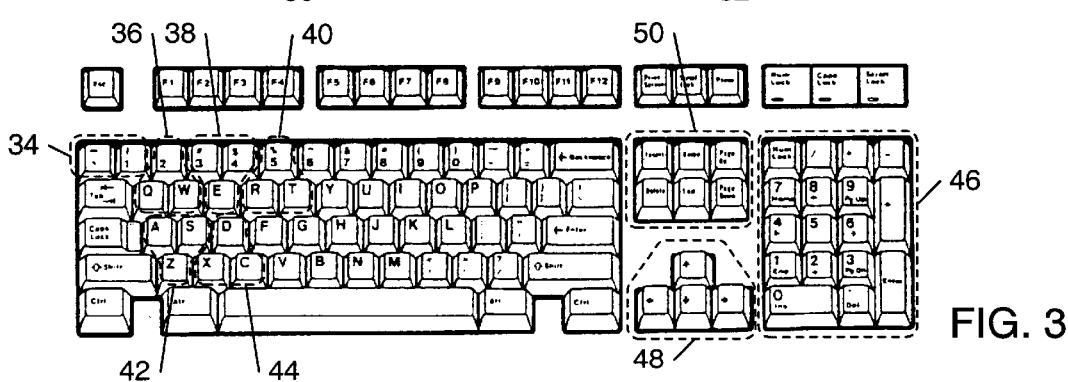
FIG. 3 illustrates a grouping of keyboard keys into compound keys for sending alphanumeric characters.

The compound key groupings shown in FIG. 2 are useful for communication with programs for which input from the user is limited to a few commands or responses. For applications which require the user to input text, a grouping such as that of FIG. 3 may be suitable. In the embodiment of FIG. 3, compound keys typically including three adjacent keyboard keys are formed. For example, compound key 36 includes the "2", "Q", and "W" keys. Although only compound keys 34 through 44 are shown in the alphanumeric block of the keyboard of FIG. 3, the remainder of the alphanumeric keys may be similarly grouped. The character corresponding to one of the keys included within each compound key is assigned to that compound key. Actuation of compound key 36 therefore sends either a "2", "Q", or "W" to a program running on the computer. The grouping of FIG. 3 therefore results in an availability of only about one-third of the alphanumeric characters in a given keyboard configuration. To make all of the characters available, a switching between different keyboard configurations may be employed. In the embodiment of FIG. 3, compound keys 46, 48 and 50 may be used to select a desired keyboard configuration (and the corresponding available character set).

An illustration of the use of keys 46, 48 and 50 to switch between the keyboard configurations of FIG. 3 is given by Table I. In the embodiment of Table I, actuating key 46 causes a first keyboard configuration to be used. The characters sent when compound keys 34 through 44 are actuated and the keyboard is in this first configuration are shown in Table I. For example, "1" is sent in the first configuration using key 34, and "r" is sent using key 40. If key 48 is actuated, subsequent keystrokes are interpreted using a second keyboard configuration. Actuating compound keys 34 through 44 with the keyboard in this second configuration causes a different set of characters to be sent, as shown in Table I. Actuation of key 50 causes a switch to a third keyboard configuration which provides a third set of available characters, as also shown in Table I. Use of larger compound keys for alphanumeric keys, in conjunction with switching between different keyboard configurations, can provide effectively larger keys which may be easier for disabled users to actuate, while still making all of the alphanumeric characters available. In addition to the use of one compound key for each keyboard configuration, as described above, multiple other methods of switching between keyboard configurations may be used. For example, a single compound key, such as key 46, could be actuated once, twice, or three times to select a first, second, or third keyboard configuration. As another example, a single compound key could be used to scroll through the various available configurations, and a different compound key could be used to select the desired configuration. An embodiment of the system employing such a method of configuration selection would preferably include an indication of the currently active keyboard configuration on the display screen of the computer. Such indications are discussed in more detail in the description of FIG. 4 below.

TABLE I

Exemplary character assignments for compound keys of FIG. 3

| Compound key from FIG. 3 | Character sent by actuating compound key | | |
|---|---|---|---|
| | Key 46 actuated most recently | Key 48 actuated most recently | Key 50 actuated most recently |
| 34 | 1 | ' | 1 |
| 36 | q | w | 2 |
| 38 | 3 | 4 | e |
| 40 | r | t | 5 |
| 42 | a | s | z |
| 44 | x | c | d |

Figure 4:
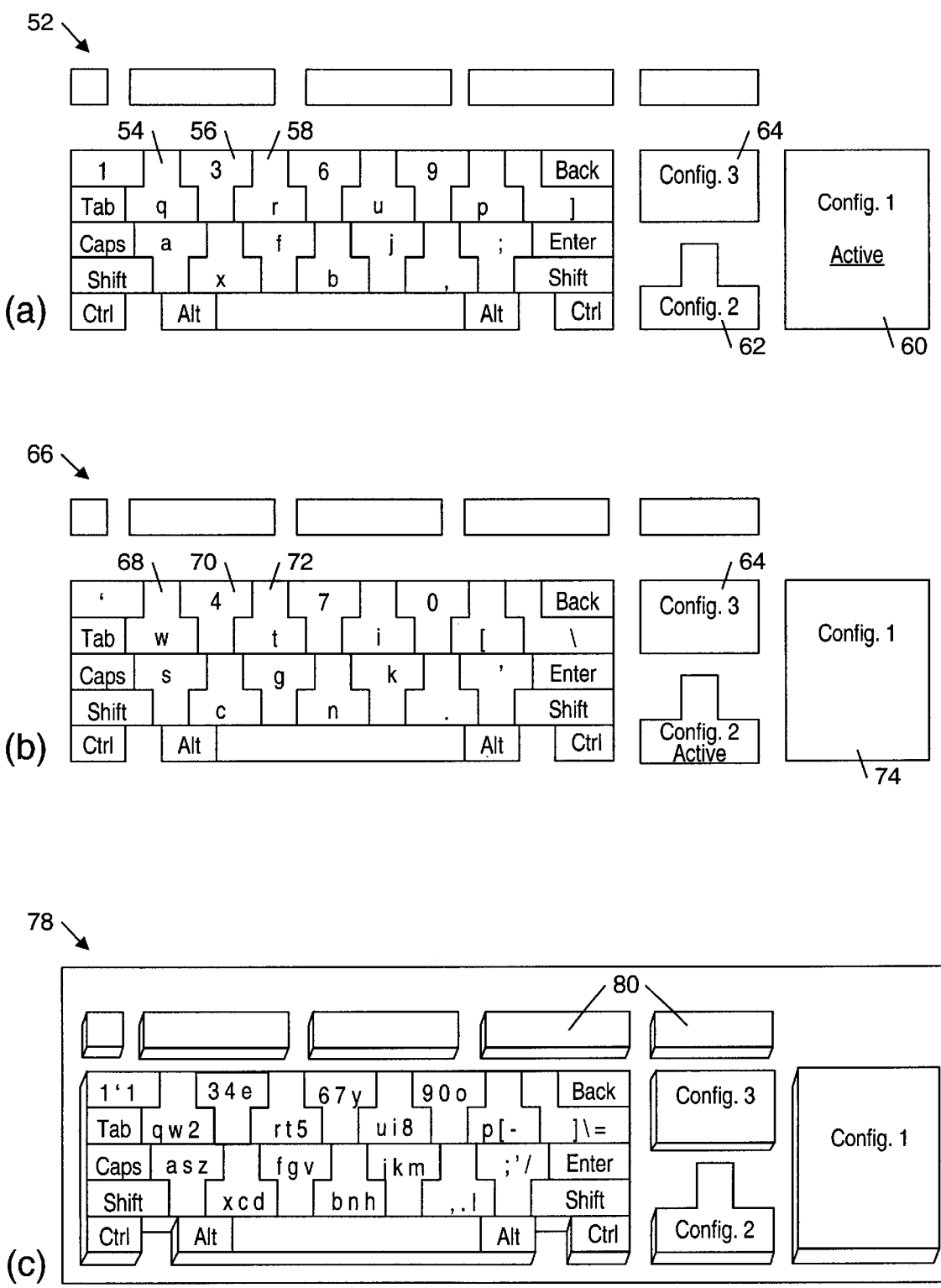
FIGS. 4a–4c illustrates embodiments of keyboard guides used to identify compound keys to a keyboard user.

It should be noted that the compound key groupings shown in FIGS. 2, 3 and 4 are exemplary groupings for illustration of the system and method recited herein. These groupings are not necessarily optimized with respect to factors such as ease of use or minimization of required keystrokes, and many other groupings may also be suitable.

Particularly in the case of embodiments such as that of FIG. 3 in which changing keyboard configurations may be employed, a guide showing the active keyboard configuration to the user may be helpful. Possible embodiments of such a guide are illustrated in FIG. 4. FIG. 4(a) shows a representation 52 of a configuration of the keyboard of FIG. 3. This representation is preferably displayed upon a portion of the display screen used with the computer. Representation 52 includes representations of alphanumeric compound keys, including representations 54, 56, and 58, which correspond to compound keys 34, 36 and 38 of FIG. 3, respectively. Representation 52 further includes representations of other compound keys, such as representations 60, 62 and 64, which correspond to compound keys 46, 48 and 50 of FIG. 3, respectively. Key representations 54, 56 and 58 each include the character sent by actuating the corresponding key. In the embodiment of FIG. 4(a), key representations 60, 62 and 64 correspond to compound keys which are used to select the keyboard configuration. These representations therefore include a label stating the configuration selected by the corresponding key, and an indication of whether the configuration is currently active. In the embodiment of FIG. 4(a), for example, configuration No. 1 is active, such that actuating the key corresponding to key representation 56 (key 36 of FIG. 3) sends the character "q". The compound key character assignments in the embodiment of FIG. 4 are consistent with the assignments of Table I above.

Representation 66 of FIG. 4(b) is an example of a keyboard representation that may be displayed on the computer screen when a different configuration of the keyboard of FIG. 3 is selected. Key representation 76, corresponding to key 48 of FIG. 3, indicates that configuration No. 2 is active, and the representations of the compound keys of FIG. 3 are changed accordingly. Key representation 70 of FIG. 4(b) differs from representation 56 of FIG. 4(a) in that a different character is displayed. Display of keyboard representations such as 52 and 66 on a part of the display screen may allow a user to more easily identify the appropriate compound key to be actuated to produce a desired input.

In addition to the on-screen keyboard representations described above, other types of guide to the user regarding the keyboard configuration may also be suitable. for example, a template such as that shown in FIG. 4(c) may be used. Template 78 of FIG. 4(c) is adapted to overlay the keyboard, having raised sections 80 to accommodate the height of the keys. The portion of the template overlying the keys is preferably made from a material with sufficient elasticity and/or malleability to permit actuation of a compound key by pressure on the overlying portion of the template. A relatively thin plastic membrane may be suitable for this portion of the template, for example. The shape of each compound key may be indicated upon the portion of the template overlying the key. In the embodiment of FIG. 4(c), the character sent by each key in each of the possible keyboard configurations is indicated on the template. In the representations of FIGS. 4(a) and 4(b) and template of FIG. 4(c), contrasting colors may be used to aid in identification of the compound keys. As an alternative to template 78, a template having openings for the keys such that key information is displayed only on the portions of the template surrounding the keys may also be suitable.

Figure 5:
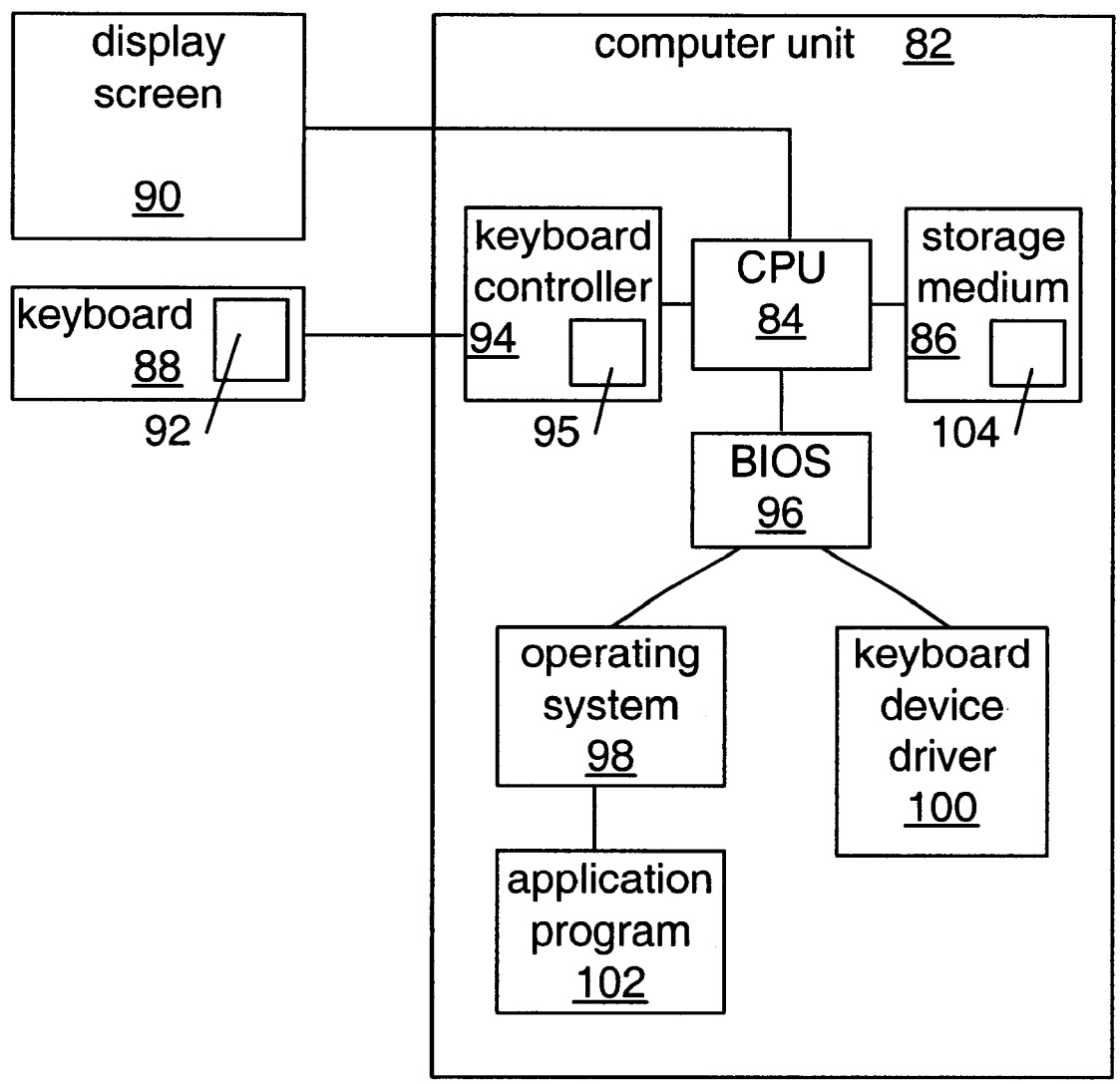
FIG. 5 is a block diagram illustrating an embodiment of a computer system which may be used to implement computer access for disabled users.

A block diagram illustrating an exemplary embodiment of a computer system which may be used to implement the system and method is shown in FIG. 5. Computer unit 82 includes central processing unit (CPU) 84, which is coupled to storage medium 86. Storage medium 86 may take many forms, such as read-only memory, random-access memory, a magnetic disk such as a hard drive or floppy disk, an optical disk, and/or a magnetic tape. Storage medium 86 includes key code correspondence data 104, which helps to relate a particular keyboard key to the command sent to a program running on the computer when the key is actuated. A user may interact with the system of FIG. 5 using keyboard 88 and display screen 90. Keyboard 88 typically includes a processor 92, and is coupled to CPU 84 using keyboard controller 94. In the embodiment of FIG. 5, CPU 84 is coupled to basic input/output system (BIOS) circuit (and software) 96, which is coupled to operating system 98 and keyboard driver software 100. Operating system 98 is typically coupled to application programs such as program 102.

Figure 6:
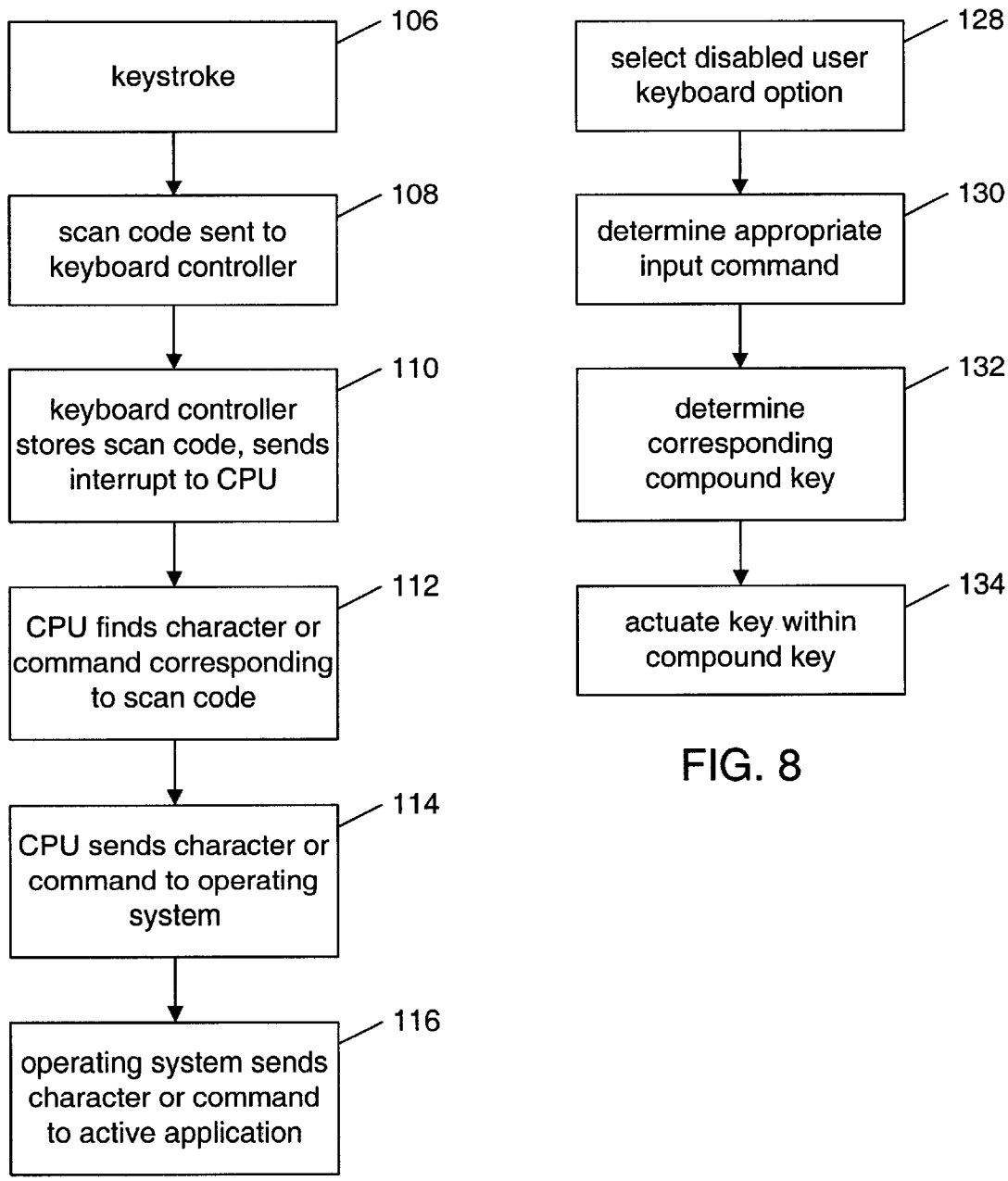
FIG. 6 is a flow diagram illustrating a typical sequence of events occurring after actuation of a keyboard key.

Operation of the system elements shown in FIG. 5 may be more clearly understood using the flow diagram of FIG. 6, which illustrates a typical process involved in processing a keyboard input. System elements from FIG. 5 are reference where applicable in describing the process of FIG. 6. Upon keystroke (or key actuation) 106, a "scan code" representing the particular key actuated is generated by keyboard processor 92 and sent to keyboard controller 94 (box 108). Keyboard controller 94 stores the received scan code in a buffer for further action by CPU 84, and sends an interrupt to inform the CPU that a keyboard input has arrived (box 110).

Keyboard controller 94 may include de-bounce logic 95. Debounce logic 95, which may be implemented in software and/or hardware, causes scan codes which arrive within a predetermined time interval following the arrival of an initial scan code to be ignored. In this way, a user may actuate multiple single keys within a compound key in the process of actuating the compound key, while the computer recognizes only a single actuation of the compound key. This feature may be advantageous for users with limited manual control. A time interval longer than that used in conventional de-bounce logic is believed to be most appropriate for the predetermined time interval. For example, a time interval of a second or more may be suitable. The system could also be configured so that the time interval is set by the user, to accommodate variations in manual speed and dexterity.

CPU 84 uses key code correspondence data 104 (in this case the key code is a scan code) to identify the command or character corresponding to the keystroke (box 112). The key code correspondence data may be a part of keyboard driver software 100, and driver 100 may be accessed through BIOS 96. The BIOS, often referred to as "firmware" because it links the hardware and software layers in the computer, may store in nonvolatile memory the system memory location at which driver 100 may be found. The character or command corresponding to the keystroke is sent or made available to operating system 98 (box 114). Operating system 98 determines which of any application programs (such as program 102) running on the computer is currently active, and sends the character or command to that program, as shown in box 116 of FIG. 6.

Returning to FIG. 5, it should be noted that a computer system suitable for the system and method may include other components not explicitly shown. For example other input/output devices such as a mouse or disk drive may be included. Furthermore, the elements of a system may be interconnected in multiple ways other than those explicitly shown in FIG. 5. For example, an application program such as program 102 may in some cases receive and process keyboard scan codes, rather than receiving a character from the operating system after conversion from a scan code. Furthermore, in the block diagram of FIG. 5 the blocks are intended to represent functionality rather than specific structure. Implementation of the represented system using circuitry and/or software could involve combination of multiple blocks into a single circuit or program, or combination of multiple circuits or programs to realize the function of a block. For example, storage medium 86 may include memory associated with various elements, including CPU 84, keyboard controller 94, and BIOS 96.

Figure 7:
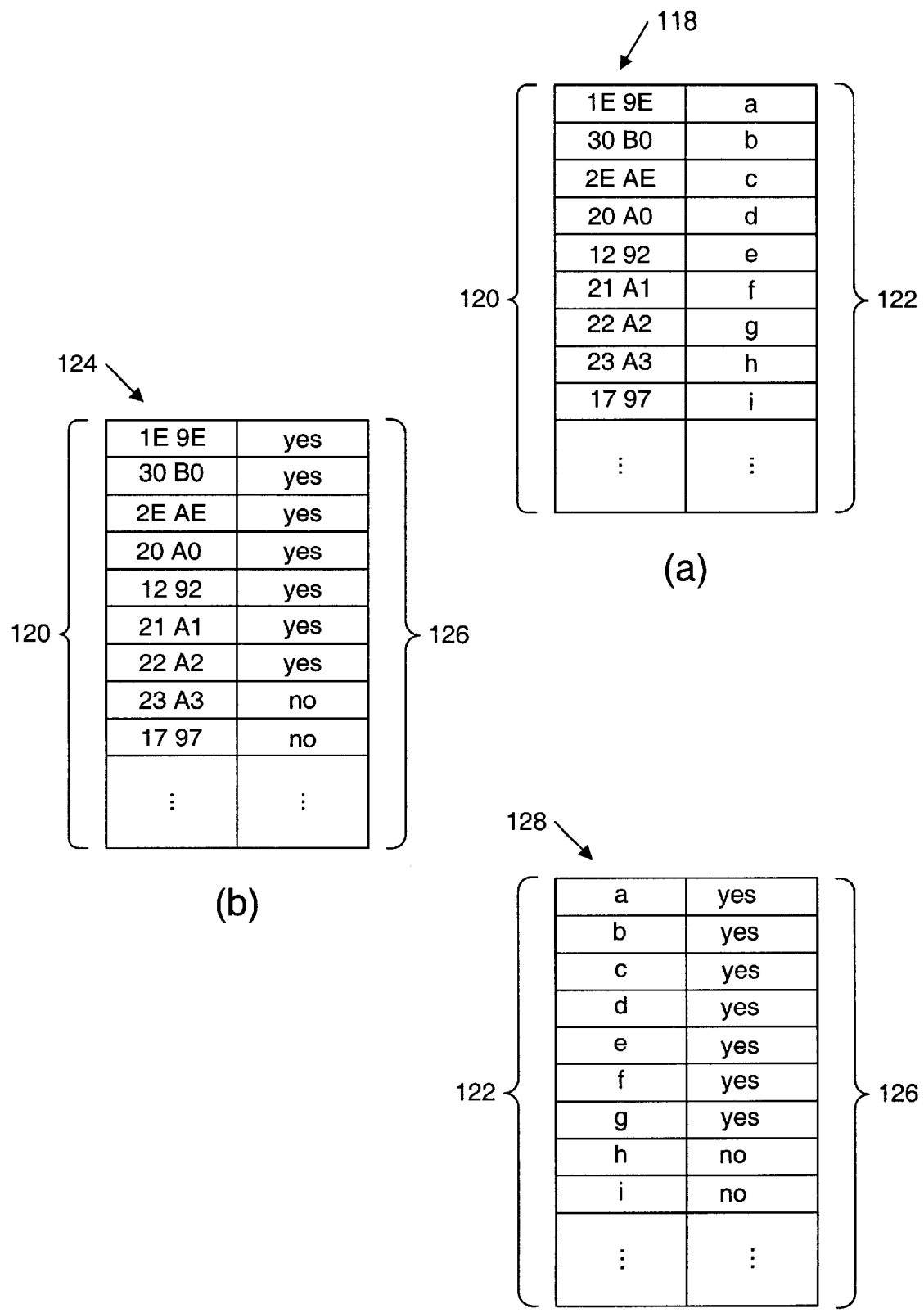
FIGS. 7a–7c illustrates exemplary correspondence data between key codes and characters or commands sent to a program running on the computer.

The process described in the flow diagram of FIG. 6 could apply to use of a conventional keyboard or to use of a keyboard configured for disabled user access as described herein. In the embodiment of FIG. 6, the configuration of the keyboard for disabled user access is preferably accomplished during performance of box 112, the identification of the character or command corresponding to the particular key actuated. If the keyboard is configured for disabled user access as described herein, the character or command identified in box 112 may be a compound key character or command. In particular, correspondence data 104 may contain a correspondence between key codes and compound key commands. Portions of correspondence data 104 for various computer system configurations are shown in FIG. 7. Data table 118 shown in FIG. 7 (a) may be contained within correspondence data 104 for use in identifying characters to be sent using a conventional keyboard configuration. Scan codes 120 may be received by CPU 84 through keyboard controller 94. Characters 122 correspond to these scan codes; for example, hexadecimal code 1E 9E represents a pushing down and releasing of the "a" key. In the embodiment of FIG. 6, each of characters 122 is sent to the operating system if the corresponding scan code 120 is received.

A different set of correspondence data, such as that of FIG. 7(b), may be used in a system having a keyboard configured for a disabled user. Data table 124 may be contained within correspondence data 104 in an embodiment corresponding to the compound key grouping of FIG. 2(a) . In data table 124, scan codes 120 are related to compound key commands rather than conventional key characters. By comparing FIGS. 7(a) and 7(b), it can be seen that scan codes corresponding to letters "a" through "g" correspond to a "yes" compound key command, while scan codes corresponding to letters "h" and "I" correspond to a "no" command. This is consistent, for example, with the compound key grouping of FIG. 2(a) as described above. The mapping of multiple scan codes into a single response such as "yes" or "no" effectively creates very large keys with which such responses may be input to the computer.

The data in FIGS. 7(a) and 7(b) may be accessed by CPU 84 in processing scan codes received from the keyboard. From a software perspective, such processing may be directed by various programs, such as the operating system or an application program. In an alternative embodiment, data such as that shown in FIG. 7(c) may be used to identity the command to be sent when a key is actuated. Data table 128 relates key characters 122 to compound key commands 126. Identification of compound key commands using table 128 may be performed by a program after characters input from the keyboard are identified using correspondence data such as that of table 118 in FIG. 7(a). Correspondence data such as that shown in FIG. 7 may be stored using various data structures, or organization methods. For example, a look-up table may be used to relate the key codes (either scan codes as in FIGS. 7(a) and 7(b) or alphanumeric characters as in FIG. 7(c)) to the corresponding command or character to be sent.

Turning now to FIG. 8, a flow diagram illustrating a method of using a keyboard configured for a disable user is shown. In the embodiment of FIG. 8, the user first selects the desired keyboard configuration (box 128). This selection may be enabled in multiple ways. For example, a selection may be accepted through a control panel window provided by the operating system. Selection of a particular keyboard configuration through the control panel may, for example, set a status bit that is checked by the BIOS to determine to which of several alternate keyboard device drivers to direct the CPU. Such a status bit could alternately be used by a driver routine to choose one of various options within the driver. Other possible selection mechanisms include responding to queries from the BIOS routine during startup of the computer, or making a keyboard selection through an application program specifically designed for disabled users. Possible configurations for disabled users may include the key groupings shown in FIGS. 2 and 3.

With the keyboard configuration selected, the user then determines the appropriate input command or response to be sent to the computer (box 130). Such a determination may involve, for example, determining the desired response to a query made by a program running on the computer. The user then identifies the key, typically a compound key, which corresponds to the desired input command (box 132). This identification may include comparing the desired input command to a representation of the keyboard which shows the location of the compound keys and the command associated with each key. Such a representation may appear, for example, on the computer display screen or on a template overlying the keyboard, as discussed in reference to FIG. 4 above. The appropriate compound key is then actuated by pushing down one or more of the keys within the compound key (box 134).

Figure 9:
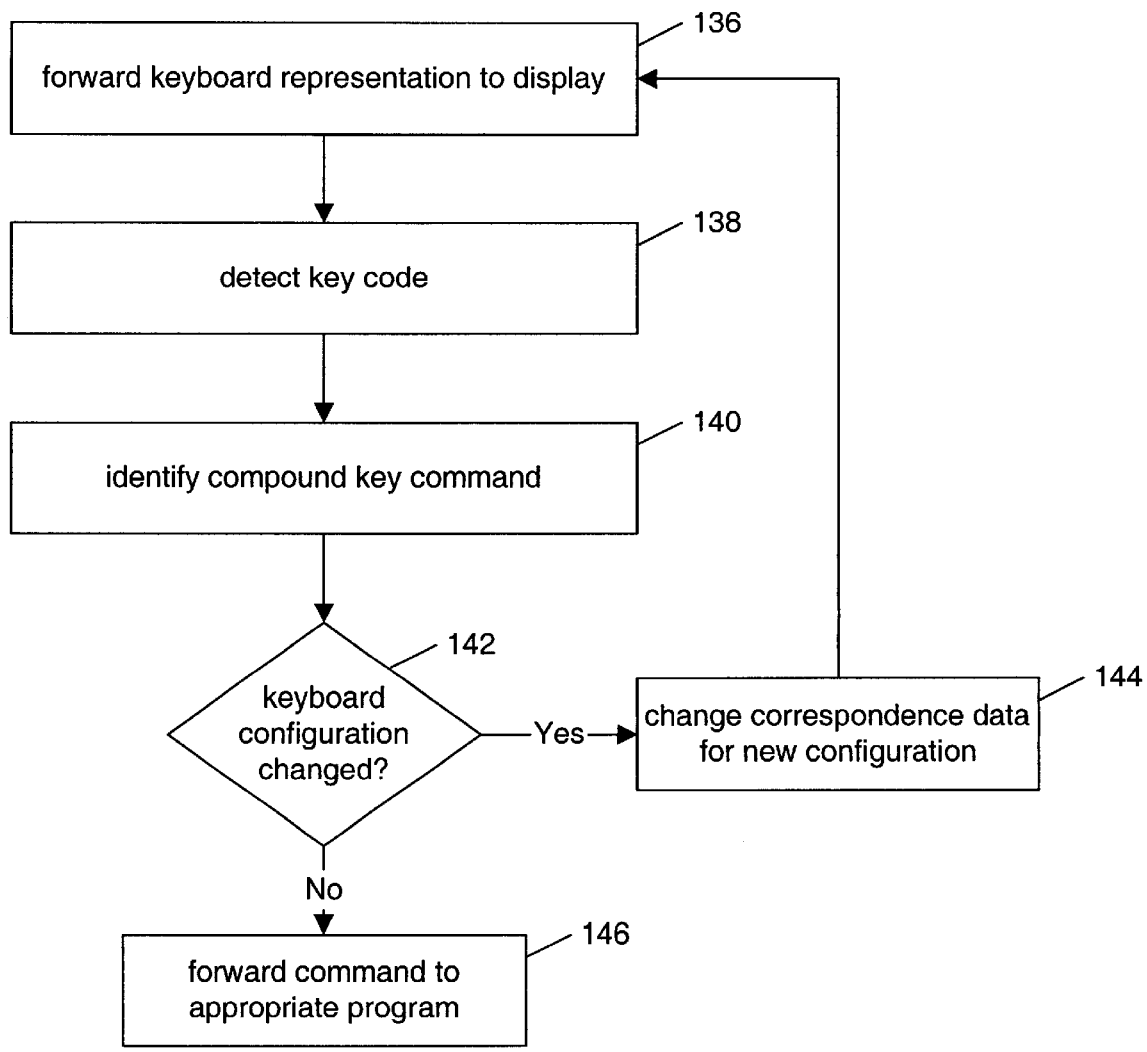
FIG. 9 is a flow diagram illustrating an embodiment of a method for processing an input from a keyboard configured for a disabled user.

A flow diagram illustrating an embodiment of a method for processing an input from a compound key on a keyboard is shown in FIG. 9. In the embodiment of FIG. 9, a representation of the keyboard is forwarded to the display screen of the computer (box 136). Representations such as those shown in FIG. 4 may be used. If a key is actuated by a user, a key code is detected (box 138). This key code is typically a scan code sent to the processor by the keyboard controller, but could also be, for example, an alphanumeric character passed to the operating system or an application program following conversion from scan codes to characters. The compound key command corresponding to the key code is then identified (box 140). This identification preferably involves using correspondence data such as that illustrated in FIGS. 7(b) and 7(c) to find the command corresponding to a particular key code. If the identified command does not involve changing the keyboard configuration ("no" branch of decision box 142), the command is sent to the appropriate program (box 146). This program may be the operating system running on the computer, or it may be an application program with which the user is interacting.

If the identified command does change the configuration of the key board ("yes" branch of box 142), however, the correspondence data used in the identification of box 140 is changed (box 144). This change in correspondence data may be implemented in the BIOS, for example, by storing a memory location for an alternate keyboard device driver to be accessed by the processor. The change could also be implemented in other ways, such as by setting a bit that is checked by the keyboard driver, in an embodiment for which the keyboard driver includes subroutines corresponding to various keyboard configurations. A representation of the keyboard corresponding to the new configuration is then forwarded to the display screen (box 136) to aid the user in identifying compound keys for subsequent input commands.

Program instructions implementing a method such as the above-described method for processing compound key inputs may be transmitted over or stored on a carrier medium. The carrier medium may be a wire, cable, or wireless transmission link, or a signal traveling along such a wire, cable or link. The carrier medium may also be a storage medium, such as a read-only memory, a random access memory, a magnetic or optical disk, or a magnetic tape.

It will be appreciated by those skilled in the art having the benefit of this disclosure that this invention is believed to provide a system and methods for grouping together multiple keys on a keyboard to form compound keys. Furthermore, it is also to be understood that the form of the invention shown and described is to be taken as exemplary, presently preferred embodiments. Various modifications and changes may be made without departing from the spirit and scope of the invention as set forth in the claims. In particular, the system and methods described herein may be implemented using many combinations of hardware and/or software, and at one or more of many different levels of hardware and/or software, as is the case with many computer-based applications. It is intended that the following claims be interpreted to embrace all such modifications and changes.

What is claimed is:

1. A computer system, comprising:

a central processing unit;

a storage medium coupled to the central processing unit;

a keyboard coupled to the central processing unit; and program instructions stored in the storage medium, wherein the program instructions are executable to group keys on a keyboard into at least one compound key that corresponds with a specific command, wherein said specific command comprises an alphanumeric character or a response to a query, wherein the compound key is adapted for execution of the specific command upon actuation of one or more of the grouped keys within the compound key, and wherein each compound key comprises at least two keys which are substantially adjacent to one another.

2. The system as recited in claim 1, wherein said storage medium comprises volatile or non-volatile memory locations accessible by the program instructions, said memory locations contain data which maps user actuation of keys to corresponding said specific commands.

3. The system as recited in claim 1, wherein said program instructions comprise a keyboard driver comprising said mapping data.

4. The system as recited in claim 1, further comprising de-bounce logic operable within an adjustable time interval to disregard successive keyboard inputs in favor of an immediatley preceding, initial keyboard input if said successive keyboard inputs occur within the adjustable time interval of the initial keyboard input.

5. The system as recited in claim 1, wherein the program instructions further comprise a computer-executable program configured to respond to commands sent using the compound keys.

6. The system as recited in claim 1, wherein the program is configured to operate with user input submitted using the compound keys exclusively.

7. The system as recited in claim 1, further comprising:
a display screen coupled to the central processing unit; and
a representation of the keyboard and multiples of said compound key, wherein the representation is adapted for display on the display screen, and wherein the representation includes an indication of the specific command corresponding to each compound key.

8. The system as recited in claim 1, further comprising a template adapted for laying over the keyboard, wherein the template illustrates the grouping of keys into multiples of said compound key, and wherein the template includes an indication of the specific command corresponding to each said compound key.

9. The system as recited in claim 1, wherein said specific command of one said compound key is selectible based on actuation of another compound key.

10. The system as recited in claim 1, wherein the specific command corresponds with one of said at least two keys encompassed by said compound key, whereby actuation of another compound key executes the program instructions to cause another specific command to be selected corresponding with the other of said at least two keys.

11. A method for using a keyboard, comprising:
mapping at least two input commands to a single compound key upon the keyboard; and
selecting between the at least two input commands, wherein the compound key is adapted for execution of the selected input command upon actuation of one or more keyboard keys grouped within the compound key.

12. The method as recited in claim 11, wherein said selecting comprises actuating a toggle compound key upon the keyboard separate from the single compound key to select between the two input commands.

13. A method for using a keyboard, comprising:
assigning a compound key on the keyboard to an input command, wherein said input command comprises an alphanumeric character or a response to a query, wherein the compound key comprises at least two adjacent keyboard keys;
receiving input of one or more keyboard keys grouped within the compound key; and
carrying out the input command assigned to the compound key upon receipt of the received input.

14. The method as recited in claim 13, wherein said assigning comprises comparing the keyboard to a representation of the keyboard displayed on a display screen of a computer, wherein the representation of the keyboard illustrates a grouping of the keyboard keys into the compound key, and wherein the representation indicates the input command corresponding to the compound key.

15. The method as recited in claim 13, wherein said assigning a compound key comprises overlying the keyboard with a template that illustrates a grouping of the keyboard keys into the compound key, and wherein the template indicates the input command corresponding to the compound key.

16. The method as recited in claim 13, further comprising actuating a toggle compound key, wherein the toggle compound key comprises a compound key configured to switch between multiple keyboard configuration options.

17. A method for processing input to a computer, comprising:
detecting a key code generated by actuation of a keyboard key;
identifying a compound key command corresponding to the key code, wherein at least one multiple key code generated by actuation of substantially adjacent keyboard keys corresponds to a single compound key command, and wherein said single compound key command comprises an alphanumeric character or a response to a query; and
forwarding the compound key command to a program executable on the computer.

18. The method as recited in claim 17, wherein said detecting comprises receiving an alphanumeric character, and wherein said identifying comprises comparing the alphanumeric character to correspondence data relating alphanumeric characters to compound key commands.

19. The method as recited in claim 17, further comprising forwarding to a display screen a representation of a grouping of the keyboard keys into compound keys, wherein the representation includes an indication of the compound key command corresponding to each compound key.

20. A method for processing input to a computer, comprising:
detecting a key code generated by actuation of a keyboard key, wherein said detecting comprises receiving a scan code;
identifying a compound key command corresponding to the key code, wherein at least one multiple key code generated by actuation of substantially adjacent keyboard keys corresponds to a single compound key command and wherein said identifying comprises comparing the scan code to correspondence data relating all scan codes within compound keys to corresponding compound key commands; and
forwarding the compound key command to a program executable on the computer.

21. A storage medium, comprising program instructions adapted to (i) detect two or more key codes generated by actuation of respective keyboard keys upon a keyboard and (ii) map the key codes to a single compound key also upon the keyboard, and further comprising correspondence data used to map the key codes to the corresponding single compound key, wherein the correspondence data relates each key code within a compound key to the compound key command corresponding to the compound key.

22. The storage medium as recited in claim 21, wherein the program instructions are further adapted to select between two or more compound key commands dispatched during actuation of the compound key.

23. The storage medium as recited in claim 22, wherein said program instructions are executable upon an execution unit to forward a representation of the mapped key codes to an electronic display, wherein the representation includes an indication of the selected compound key command corresponding to said compound key.

24. The storage medium as recited in claim 22, wherein said program instructions selects between the compound key commands depending upon actuation of another toggle compound key.

25. The storage medium as recited in claim 21, wherein the program instructions reside on volatile or non-volatile memory and/or arrive over a transmission path.

26. A storage medium, comprising program instructions adapted to (i) detect two or more key codes generated by actuation of respective keyboard keys upon a keyboard and (ii) map the key codes to a single compound key command, wherein the compound key command comprises an alphanumeric character or a response to a query, and wherein the compound key command is executable by actuation of one or more of the keyboard keys.

27. The storage medium as recited in claim 26, wherein the program instructions are further adapted to select between two or more compound key commands dispatched during actuation of a single compound key.

28. The storage medium as recited in claim 27, wherein said program instructions are executable upon an execution unit to forward a representation of the mapped key codes to an electronic display, wherein the representation includes an indication of the selected compound key command corresponding to said compound key.

29. The storage medium as recited in claim 27, wherein said program instructions selects between the compound key commands depending upon actuation of another toggle compound key.

30. The storage medium as recited in claim 26, wherein the program instructions reside on volatile or non-volatile memory and/or arrive over a transmission path.

* * * * *

UNITED STATES PATENT AND TRADEMARK OFFICE
CERTIFICATE OF CORRECTION

PATENT NO. : 6,310,608 B1
DATED : October 30, 2001
INVENTOR(S) : Kaply et al.

It is certified that error appears in the above-identified patent and that said Letters Patent is hereby corrected as shown below:

Column 2,
Line 39, after the phrase "of the keyboard keys" please delete "into compound keys."

Column 10,
Line 12, please delete "key board" and substitute therefor -- keyboard --.

Column 11,
Line 5, after the phrase "comprise a keyboard" please insert -- device --.
Line 10, please delete "immediatley" and substitute therefor -- immediately --.

Signed and Sealed this

Thirtieth Day of July, 2002

Attest:

Attesting Officer

JAMES E. ROGAN
*Director of the United States Patent and Trademark Office*